April 1, 1958     H. J. THOMAS     2,828,851
ARTICULATING CONVEYOR SYSTEM AND UNIT THEREFOR
Filed Oct. 17, 1956     5 Sheets-Sheet 1

INVENTOR
Howard J. Thomas
BY *Thomas, Weisman & Russell*
ATTORNEYS

April 1, 1958   H. J. THOMAS   2,828,851
ARTICULATING CONVEYOR SYSTEM AND UNIT THEREFOR
Filed Oct. 17, 1956   5 Sheets-Sheet 2

INVENTOR
Howard J. Thomas

BY Thomas, Weisman & Russell
ATTORNEYS

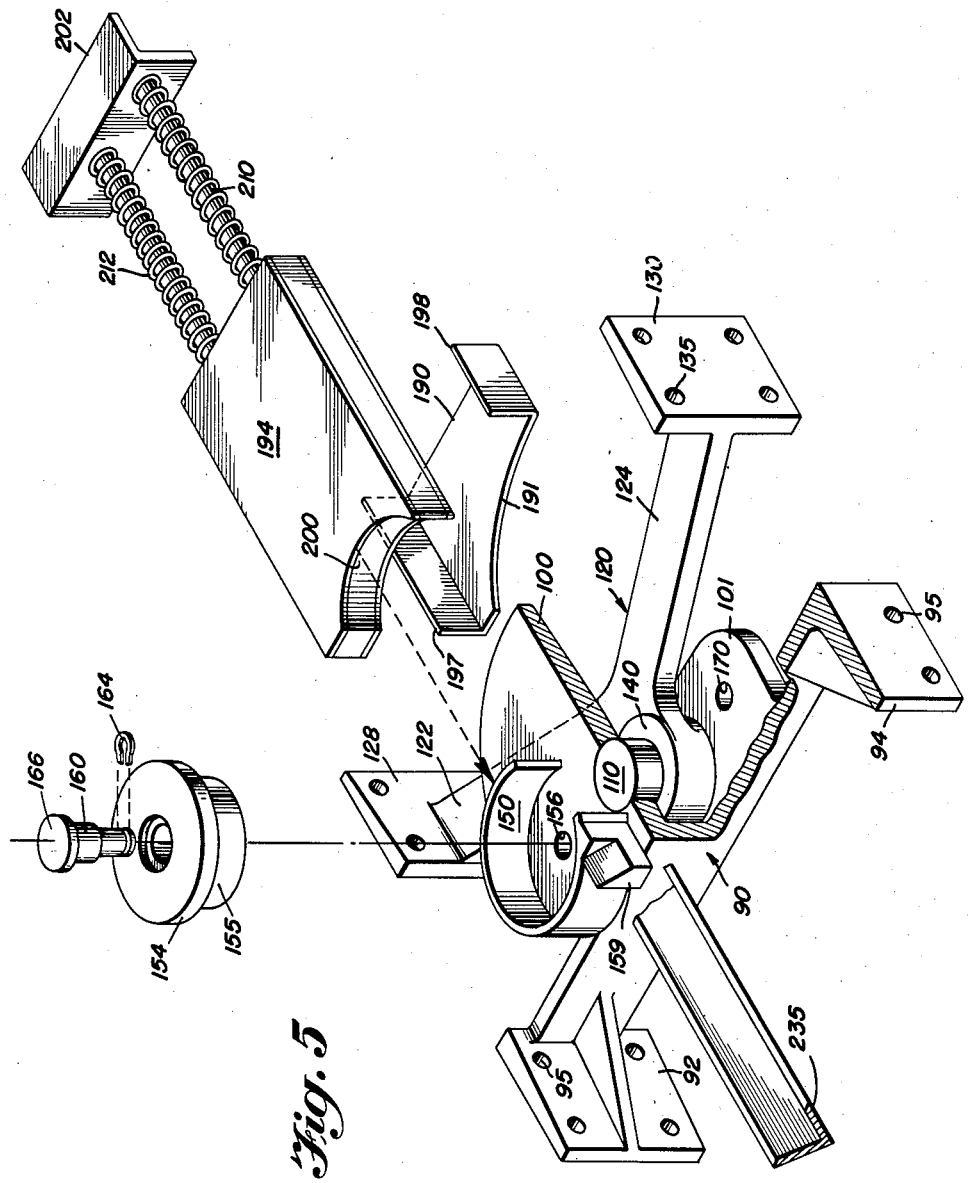

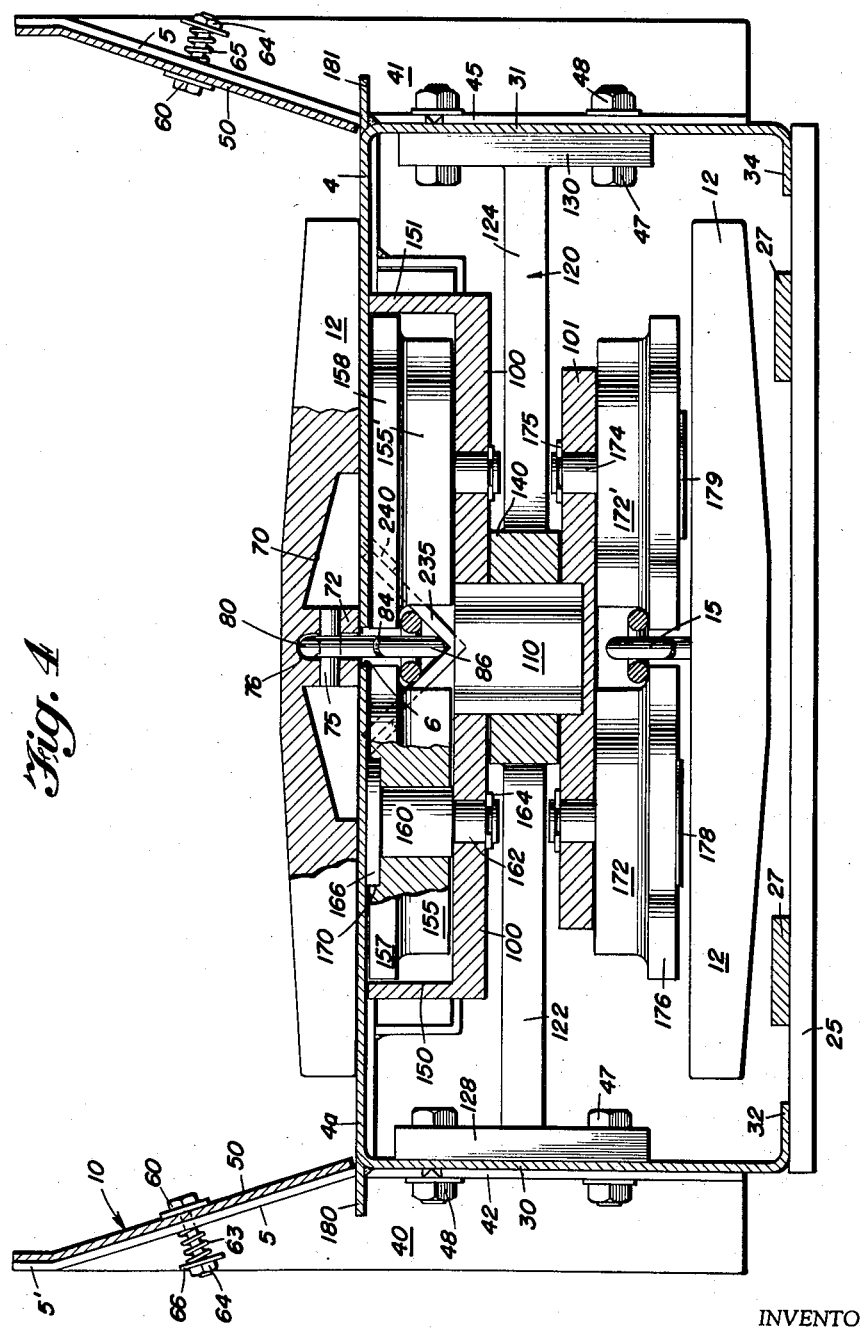

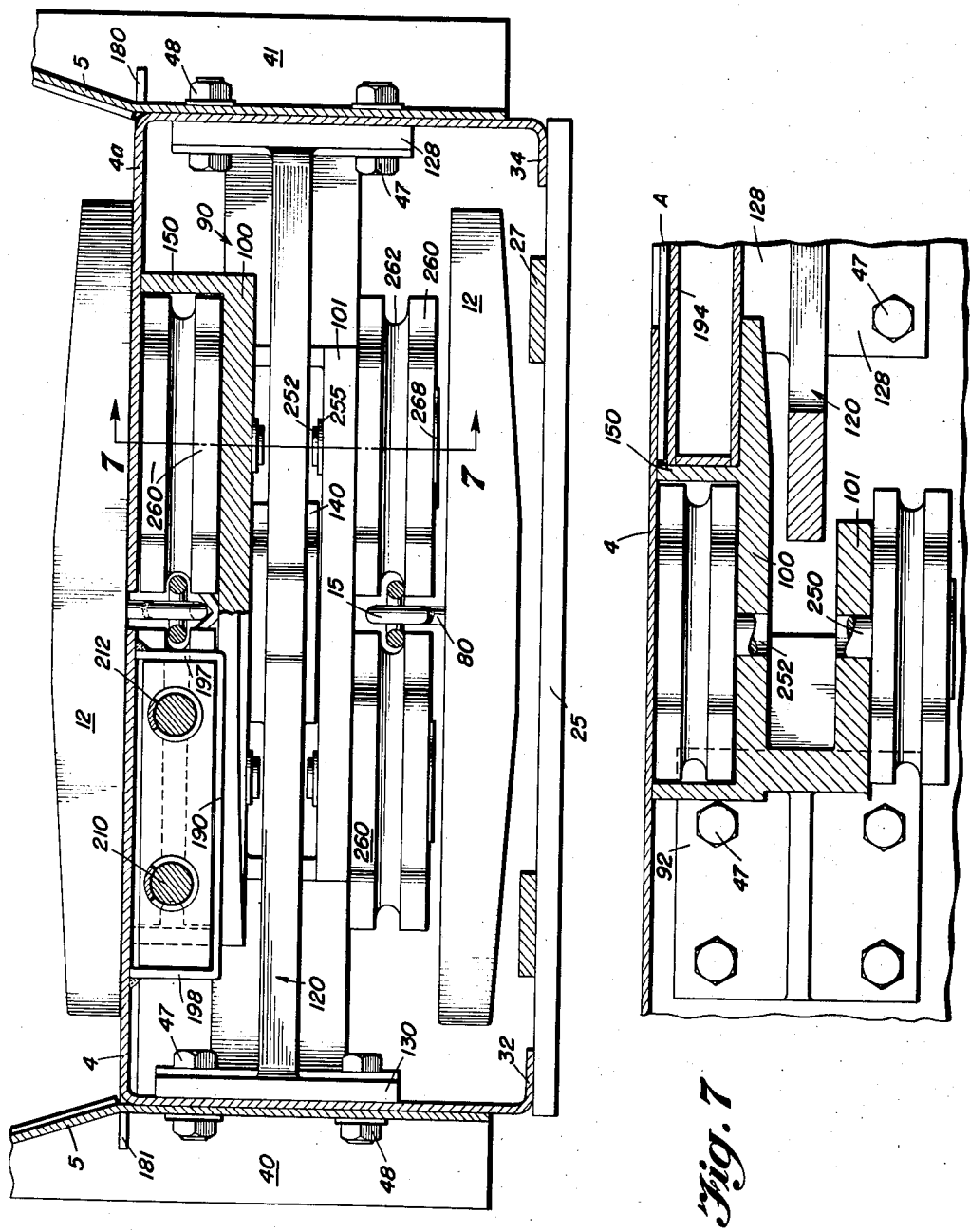

United States Patent Office 2,828,851
Patented Apr. 1, 1958

2,828,851

ARTICULATING CONVEYOR SYSTEM AND UNIT THEREFOR

Howard J. Thomas, Huntington, W. Va.

Application October 17, 1956, Serial No. 616,538

9 Claims. (Cl. 198—109)

This invention relates to an articulated, endless type, chain and flight conveying system and to apparatus particularly adapted to the conveying of such bulk materials as coal. The invention may further be described as a basically straight line system, the individual units of which are so interconnected as to permit angular disposition, both laterally and vertically, of the units with respect to each other while still maintaining the series of flights along the center line.

The primary conception of this invention resides in a unique method and means for the interconnection of individual conveyor troughs, all powered through the same common power source, and all pivotally interconnected by means which control the centering of both the conveyor flights and the drag chain, irrespective of the angle presented between individual conveyor units or troughs. The invention is further characterized in the provision of novel flight and chain control means at the pivot point between these integrated units, both with respect to the top, conveying flights as well as with respect to the rear flights, such assuring proper turning of the drag chain about a central pivot point. In other words, not only does the mechanism at the pivot point between adjacent units centrally locate such conveying flights during the course of making a turn necessitated by a zig-zag formation, but it achieves this same centering function with respect to the return flights.

In both instances, the series of flights are maintained in close relationship with or adjacent to the bottom of the trough. With respect to the conveying flights, "clamp down" upon the material being conveyed is thus effectively prevented. Furthermore, this maintenance of chain and flights immediately adjacent the pan of the trough is important with respect to vertical angularities which may be assumed, particularly where there are low swags, such as are frequently found in the floor of a coal mine.

Many devices have been proposed in the past intended to solve the variant problems involved in conveyance of materials from one conveying trough to another when the interconnected units are angled either laterally or vertically with respect to adjacent units. The difficulty has been in centering the flights and drag chain therefor in such manner as to eliminate excessive frictional wear. It is obvious that as the flights and chain progress throughout a zig-zag pattern made-up of several integrated units which are angled with respect to each other, the tendency of the flights as well as the chain is to take the shortest course, or to progress along the inside or short side of the deflection. This will cause the same to bear excessively against one or the other of the sides of the two troughs where they are so angled to each other. Such frictional contact necessarily induces excessive wear and, furthermore, this increased frictional contact places a large additional load upon the power source, particularly where the conveyor assembly is of relatively extended length.

Relating to the disadvantages which have been enumerated in the foregoing are the further practical impediments found in conventional apparatus. These have to do with the take-up of excess chain during its circuitous course through a zig-zag pattern of integrated units. Manifestly when the drag chain, either above or below the base of the trough, is not centered at the pivot point between units, the distance to be traveled will vary, depending upon whether the units are positioned in straight line fashion or deflected with respect to each other. Accordingly, in those instances where such troughs follow a zig-zag pattern as distinguished from straight line, or where either the lateral or vertical deflection with respect to adjacent units is relatively substantial in degree, a take-up mechanism of some type must be provided to account for the excess amount of chain, or the slack, when these units are positioned in the described manner. As intimated above, this is because the drag chain and flight assembly will naturally seek the shortest course; if not centered at the pivot point but allowed to bear against the inside of the curve, less chain is needed than when the integrated units are positioned in straight line fashion. Hence, in the past, and having no provision for centering at the pivot point, angular positioning of trough conveyor units necessitated a take-up system of one form or another to account for the resultant slack in the drag chain and flight assembly. Such take-up devices, of whatever type, are generally comparatively complex and, consequently, involve constructions expensive to build and maintain.

The present invention obviates the difficulties enumerated in the foregoing with reference to conventional types of equipment. By presenting a unique method of centering the drag chain (and, hence, the flights) around the pivotal point where two of such units are interconnected, an effective, articulated system is provided. In the instant case, the flight assembly is placed under a constant and nonvariable tension throughout despite vertical or lateral deflection between the articulated units. The means to accomplish such constant control, and involving a centering function, takes the form of two pairs of pulleys or idler wheels mounted on each side of, and off center with respect to, the fulcrum point. The wheels lying immediately adjacent and underneath the base of the trough guide the drag chain during its conveying cycle around the pivot point; and the idler wheels or pulleys located underneath the upper idlers perform the same function with respect to the drag chain on its return movement.

Moreover, in those improvements which have been made to conventional trough conveyor systems, there has been no provision for guiding the return flights, or flights underneath the base of the trough, around a central point or at the fulcrum point where separate units are interconnected with each other and angled to each other. The guiding of the return line is an important facet of the instant invention.

In addition, the instant invention couples this concept of drag chain centering with the further improvement of a means to prevent discharge of conveyed materials even though the angle between units be considerable. In this aspect, use is made of a hinged joint consisting of interfitting male and female members so located that the joint is closed despite the angularity between the conveyor units. Such a joint is flexibly mounted in the desired position by tension devices constantly functioning to keep the areas of interconnection sealed despite any imposition of angularity upon adjacent units. Also, a further form of slip-joint is utilized as a means of interconnection between adjacent conveyor troughs. Such a seal, in addition to other sealing means, includes an extension of the trough base at one end of the individual unit, such extension being arcuately formed so as to occupy the space that would normally be open in the base when such troughs are angled laterally to each other.

It is, accordingly, a primary object of this invention to provide a flight type of conveyor system, as well as the integrated units therefor, which presents an efficient method and means of conveying materials from one point to another without restricting the articulated units thereof to single plane or straight line positioning with respect to each other. Thus the system permits conveyance around obstructions in a straight line path without any loss of efficiency due to an increased power load.

It is a further object of the invention to provide a system of this type wherein the drag chain and the flights interconnected therewith are centered throughout the length of individual units and pivoted at the fulcrum point of adjacent units even while the latter are in a curved or zig-zag position. This is achieved by twin guide roller assemblies positioned on each side of such fulcrum point and with adjacent pairs being in axial alignment with each other so as to accommodate not only the conveying flights but also the return line of the drag chain as well. As a matter of fact, the return line of the drag chain and flight assembly follows the exact line of movement of the conveying flights. Furthermore, in the use of the roller idler elements just referred to, a practically frictionless centering operation is obtained.

Another object of the invention is the provision of means at or near the point of pivoting which, despite the angle of lateral or vertical inclination of one unit to the other, prevents spillage of coal at this pivot point; this function is achieved despite even rather extreme angles of angularity, particularly with respect to the lateral, between adjacent units.

Another object of the invention is the provision of means, in a system of the described type, to maintain the drag chain during both its conveying as well as return movement in close proximity to the base of the pan or trough, the chain retaining means thus performing also as a hold-down, eliminating the fault found in conventional and lengthy conveyor systems of permitting the chain and flights to gradually climb up on top of the coal or other bulk materials being conveyed.

A further objective of the invention is the provision of means of so centering the chain about a pivot point as to eliminate frictional contact of the flights with the side walls of the trough—a factor which substantially reduces the amount of power which would otherwise be required.

Another objective of the invention is the provision of a system and apparatus, adaptable for use with integrated and separately angled troughs, which eliminates the need for any take-up mechanism during conveying operations where the involved angles at the points of interconnection of separate troughs are of any substantial amount; this follows from the nature of the mechanism of this invention which maintains the same chain length irrespective of whether the sysetm is articulated in any angular fashion to right or left, or vertically.

A more particular description of the invention now follows, having reference to the following drawings wherein like numeral designations are applied to like elements and wherein:

Figure 4 is a section view taken on the line 4—4 of Figure 2;

Figure 5 is a perspective view illustrating the manner of assembly of one side of the apparatus at the pivot point between two interconnected trough conveyor units;

Figure 6 is a section view taken on the line 6—6 of Figure 2;

Figure 7 is a section view taken on the line 7—7 of Figure 6;

Figure 8 is a detailed, perspective view of the drag chain supporting means found in Figure 6;

Figure 9 is a detailed view of a means for interconnecting the side walls of adjacent troughs, despite the angles therebetween, to prevent spillage of conveying materials; and Figure 10 is a perspective view taken on the line 10—10 of Figure 9.

Figure 1:
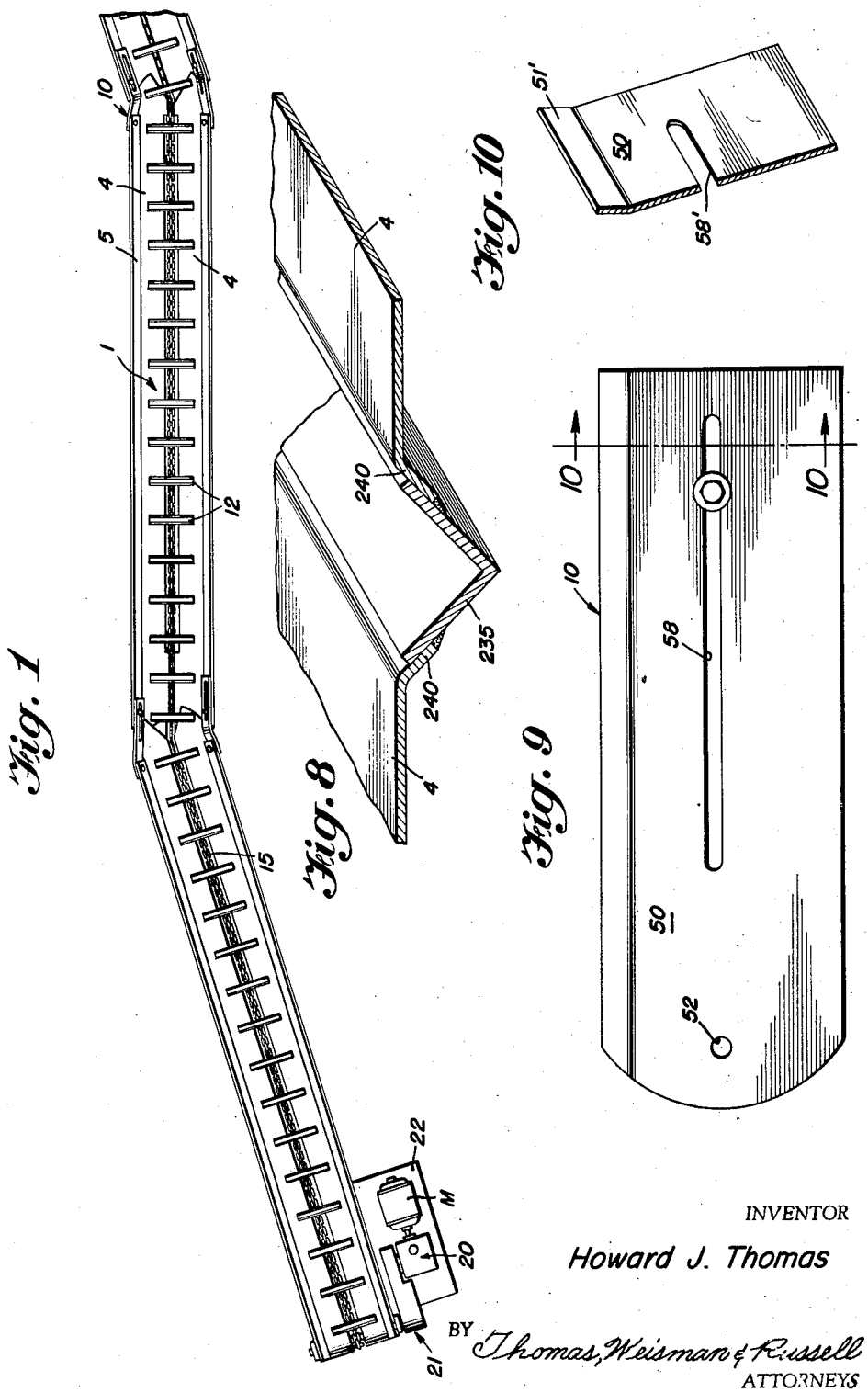
Figure 1 is a plan view of several conveyor units interconnected together and driven by a common power source, the individual units being shown as angularly disposed with respect to each other.

Referring particularly to Figure 1, it is seen that the trough conveyor units themselves, in this plan view do resemble conventional troughs known to the art. These are generally indicated at 1 and three of them are partially shown as being disposed angularly with respect to each other, having reference to a lateral or horizontal degree of angularity. The base of the trough is actually split down the center, as explained hereinafter, the two halves thereof being shown at 4, 4a. Such trough is provided with the side walls 5 inclined, as is usual, slightly outwardly. Each trough unit is fitted with side interconnecting plates, generally indicated at 10, which slidably join the adjacent ends of interconnecting units so as to close the space between units when they are deflected in the manner shown. The flights 12 engage a drag chain 15 and are connected thereto in a unique manner as will be described.

The series of articulated units is driven through a common power source, such as motor M, the latter being interconnected with the usual form of gear reduction mechanism such as generally indicated at 20 and as here generally and diagrammatically shown at 21, a chain drive. The motor unit is mounted upon a usual type of base 22.

As seen in Figure 4, each of the articulated conveyor units is mounted upon a main frame member 25, all of the correlated elements of the unit being interconnected to this frame. The latter may be suitably reinforced through longitudinal reinforcing elements, such as those shown at 27. In effect, these elements 27 may also be considered as slides or bearing members for the series of flights on their reurn movement, i. e., if the amount of slack so permits, these flights would contact such elements 27 without wear by contact with the base.

Still referring to this same sectional view, it is seen that the split base 4, 4a of each of the trough units is separated down its center line, as indicated at 6. This, of course, permits passage of the drag chain down the center line and through the twin pulley assemblies, which achieve the centering effect in a manner to be described. Actually, the base units 4, 4a of each of the troughs, and as here shown, are made integral with two side walls 30 and 31 which extend downwardly and vertically with respect to the unit. Such side walls terminate in inner flanges 32 and 34, right-angularly disposed to such walls and affixed to the main frame member 25 in any suitable manner. These side walls 30 and 31 provide main support for the side boards 5. The latter, inclined at their upper ends as shown, e. g., in Figure 4, progress downwardly in a vertical direction, forming two additional side walls 42 and 45 which are affixed, as by the bolts herein indicated, to the referred to side walls 30 and 31. The other end bolt assemblies 47 and 48, respectively, and again having reference to Figure 4, maintain these side walls in position in the manner shown and also lock in place the pivoting and centering mechanism which will be described hereinafter.

Means has been referred to for interconnecting the several side boards 5 of adjacent units in such manner that, despite angularity between units, these walls present a closed surface preventing discharge of conveyed materials at such interconnection between units. This means takes the form of plates 50, made of spring steel or some other suitable material of sufficient resiliency to permit considerable amount of flexing. These plates 50 may be affixed at one end, as by rivets 52, to one of two adjacent side walls, as indicated in Figure 9. They are also slotted, as at 58, throughout a substantial portion thereof, such a slot being adapted to receive a spring interconnection maintaining them in adjustable fashion with an adjacent and interconnecting side wall. Again having reference to Figure 4, this spring means takes the form of a helical spring 65 interconnecting the side wall 5 with the spring plate 50 by a usual form of medium such as a bolt and nut assembly 60, 64, respectively. This spring 63 in each instance bears against a suitable thrust washer 66 and tension of the spring can, of course, be regulated by adjustment of the nut 64 to the desired extent. It is to be noted, and here having reference to Figure 2, that these spring plates 50, riveted to the outside of the side walls of one unit, are inside of and in the referred to slidable relationship to the complementary side wall of the next unit. When one unit is angled with respect to an adjacent unit, the plates 50 are thus permitted to slide accordingly by means of the slotted, spring interconnection, thus maintaining a closure between the side boards.

The entire side wall structure can be additionally braced, if desired, by lateral flanges 40 and 41, positioned on each side of the walls referred to and extending at right angles to the longitudinal axis of the respective unit.

Figure 3:
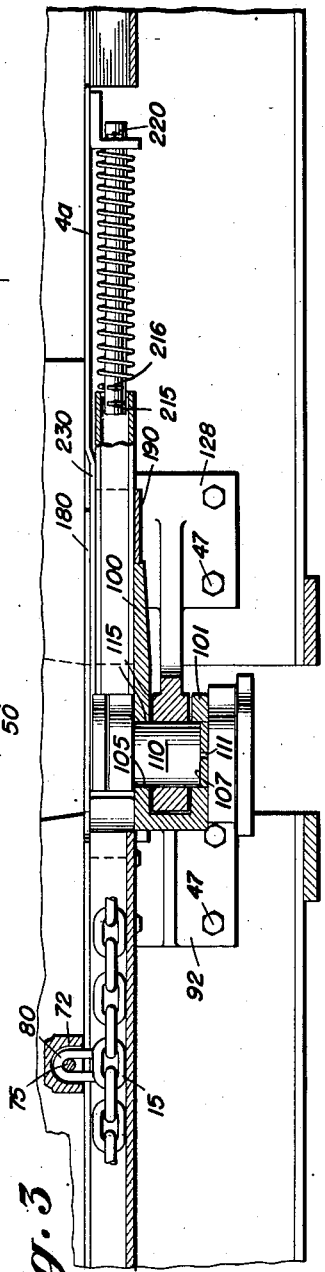
Figure 3 is a section view, taken on the line 3—3 of Figure 2.

The individual flights are of a rather unique construction in order that they can be interconnected with the drag chain in such manner as to permit the chain to ride underneath the base plates 4, 4a, yet allowing travel of the individual flights on the top of such base member. Accordingly, each flight is provided with two substantial depressions 70 or recesses at its central portion in such fashion as to leave a central, depending boss 72 suitable for the retention of a link-engaging pin 75 (Figures 3 and 4). This boss 72 is, in turn, provided with a slot 76, for reception of what might be termed a half link. Such half link 80, cut off at its lower end to form two parallel projections, is secured to a vertically disposed link, here indicated at 86 of the drag chain. The weld 84 at each of the legs of the half link accomplishes this purpose. It is thus seen that the half link in engaging the pin 75 is secured to the drag chain in such fashion that the half link will ride through the referred to slot 6 in the base member of each trough, yet the drag chain itself is positioned immediately underneath the base of the trough in a position to be centered around the pivotal centering mechanism. The means of interconnection is such that it can be made with respect to any link of the drag chain and, hence, distance between flights predetermined and varied within the desires of the operator. Furthermore, this type of interconnection permits the flights to ride freely as they are loosely held in the desired lateral position. Such eliminates a great deal of the wear normally encountered in chain and flight systems where the flights are rigidly interconnected and the sliding contact thereof more positive.

By reference to the perspective shown in Figure 5, it is seen that the interconnection between two articulated units is one of sealed, pivotal relationship. Such pivotal relationship is effectively maintained during angular positioning and also maintained during the centering function of the related elements now to be described. This centering and pivotal mechanism is the same with respect to each articulated unit, i. e., each unit has the same front or inby end assembly, and the same type of assembly at its outby end. For purposes of illustration and having particular reference to Figure 2, adjacent units of the articulated system are generally indicated at A and B, respectively. Having in mind that most trough conveyor systems operate with respect to the conveyor motion in a direction towards the power source, it is seen that the outby or rear end of unit A is shown in articulated interconnection with the inby end of unit B. The individual units of the system are thus each structurally the same at their respective inby and outby ends.

The main framework for the twin pulley assembly—the mechanism accomplishing pivoting of the drag chain at the pivot point—is positioned upon what is here termed to be the inby end of each unit. This framework consists of a main frame member 90, positioned transverse to the direction of travel of the flights and taking a U-shaped form because of two right-angular and integral extensions 92 and 94, respectively. These are each apertured as at 95 in an appropriate manner to receive bolts 47, the latter securing this main frame member 90 to each of the side walls 30 and 31. The frame is thus suspended in between these walls with substantial clearance at the top and bottom thereof, as may be understood by reference to Figure 4. The pivoting arrangement as well as the twin pulley assembly rides primarily upon this framework and, to this end, such frame 90 carries with it two parallel plates 100 and 101, spaced apart sufficiently to receive a similar type of frame member positioned on the outby end of the adjacent unit. The top plate 100 is of curved or arcuate peripheral configuration (see Figure 5) and the underlying plate 101 merely extensive enough to provide substantial support for the pivot pin and the frame member of the adjacent unit, to be referred to.

The relative positioning of the parts just referred to is made clear by reference to Figure 3. Here it is seen that the upper plate is apertured as at 105 to receive the pivot pin 110. The lower plate 101 is provided with a depression or recess 107 to receive and maintain in position the lower end of such pivot pin 110. The clearances involved are relatively substantial, as indicated at 115 and other points surrounding the pivot pin. By substantial clearance is meant tolerances sufficient in amount to permit elevation or depression vertically of one unit with respect to the other in an amount of approximately 5°. Furthermore, it is to be appreciated that the assembly involving the pivot pin 110 is extremely simple from the viewpoint of interconnection or disassembly of two adjacent units. By simply removing the pivot pin from the position shown in Figures 3 and 4, the two units may be separated. Again having reference to Figure 3, it should further be noted that the lower plate 101 is provided with a central aperture 111 to further facilitate removal of the pin 110 and to provide a drainage point for excess lubricant.

Speaking with reference to Figure 2, the pivot assembly of unit A, or the assembly on the outby end of each unit, will now be described. This assembly includes a main frame member somewhat similar in configuration to the frame member 90 of the adjacent unit B. Such frame member, generally indicated at 120, consists of a yoke having two arms 122 and 124, positioned at an obtuse angle with respect to each other. Such angularity in this embodiment of the invention approximates 115°. The yoke also is provided with two sealing plates 128 and 130 having faces which are parallel to the respective trough sides 5 and which are apertured at 135 in order that they can be secured thereto in the usual manner, such as by the nut-bolt assemblies shown in the drawings at 47—48.

At the juncture of the two arms 120 and 124, a boss 140 is provided, suitably bored to receive the pivot pin 110. Hence, units A and B are pivotally interconnected by these two assemblies which, respectively, are supported by opposed main frame members 90 and 120, the pivot pin 110 extending through the plate 100 of the assembly of unit B, through the boss 140 of unit A and into the depression 107 of unit B. The angularity which can be obtained by this assembly, and having reference to adjacent articulated units, is substantial, at least fully sufficient for operative purposes under any conditions which might ordinarily be encountered.

Figure 2:
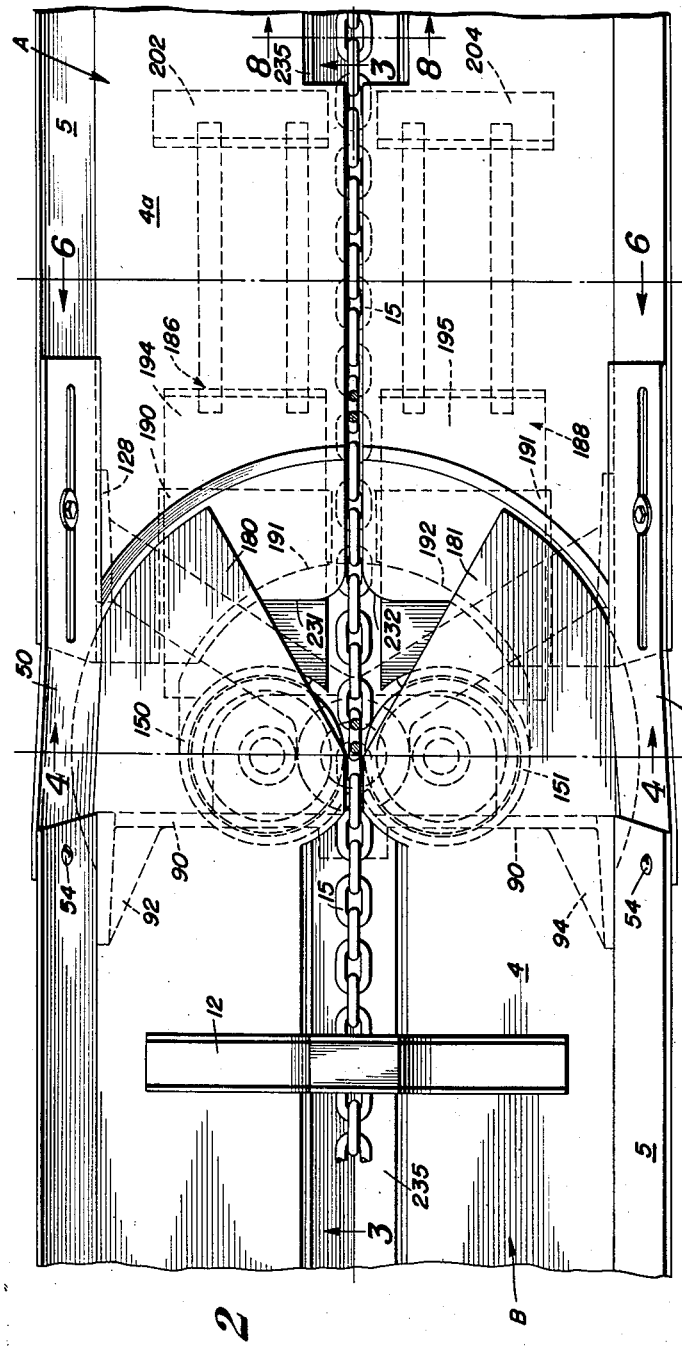
Figure 2 is an enlarged and detailed plan view of the mechanism of the invention which is utilized at the pivot point between two adjacent units of this articulated conveyor system.

In one embodiment of the invention, that shown in Figure 4, the twin pulley assemblies include the use of wheels that are flanged upon merely one side as shown in this figure as well as in Figures 2 and 3. Since these twin pulleys or sheaves for the drag chain are off center with respect to the axis of inclination or the fulcrum point between units, some provision must be made for sealing the pivotal interconnection against material losses when adjacent units are angularly inclined with respect to each other. I have provided means to achieve this objective which includes separate housings for each of the top pulleys of the chain guiding and pivoting assembly. Such casings are shown at 150 and 151 of Figure 2, with the positioning of casing 150 more clearly indicated in perspective in Figure 5. These pulley casings take the form of an arcuate member having vertical side walls with such side walls, in between the pair of casings, being broken away or terminating short of the entire circumference, as shown in the referred to figures. In other words, as these casings approach the center line of the unit, the side wall is terminated to permit passage of the drag chain down the longitudinal axis of the unit. Actually, in the embodiment of the invention herein described, these casings represent an arc of approximately 270°, the remaining 90° being open for the aforementioned purpose.

As will be seen, the chain on top of the trough pan is supported on a V-shaped element running throughout the length thereof. For purposes of continuity of this trough, a projection 159 is provided on each of the casings 150 and 151. This projection, in alignment with the longitudinal axis of the unit, has its upper side angled downwardly to the same degree of inclination as that of the chain support member and thus when the casings are positioned as indicated, the two extensions, fitted together, form a V-configuration that matches the V-shape of the chain supporting and split-pan interconnecting means.

The upper pulley wheels 155 and 155' are mounted in these two circular casings 150 and 151. The plate 100 is apertured as at 156 to receive the shaft or axis of the supporting member for such pulleys. Each of the idler wheels 155 and 155' are positioned in this manner upon the lower plate 100 of the assembly of unit B, each wheel rotating about a stationary axis 160 which is reduced in size at its lower end as at 162 to fit within the referred to apertures 156. Each of the axes 160 is secured in the position indicated by the use of clips 164, fitted into an appropriate retaining groove formed in the reduced portion 162. At the upper ends of the respective bearings 160, the same are fitted with or made integral with a retaining plate 166 that seats in appropriate recesses 170, bored within the upper face of each of these opposed pulleys.

Whatever the size of the drag chain supporting wheels may be, one factor is important—that they be so located as to provide space for the passage of the upright link of the drag chain therebetween, including the half link 80 hereinbefore referred to, and yet be close enough together to provide support for the horizontal links of the chain. As seen in Figure 4, these wheels 155 and 155', when so disposed, permit the drag chain to ride between them, but, at the same time, the respective upper flanges 157 and 158 of these wheels override the horizontal links of the drag chain and thus present a retention means for maintaining the chain in the position shown in Figure 4. In this sense, these upper pulleys then constitute a hold-down for the chain preventing it and its accompanying flight assemblies from rising above the bottom of the trough any appreciable extent, or at least so maintaining the individual flights in close relationship with the trough bottom as to prevent any conveyed material from gathering underneath or jamming either the drag chain or the flights.

The lower pulleys or idlers 172 and 172' are mounted in the same manner and in axial alignment with the opposed, respective upper pulleys. These lower sheaves are also suspended in rotatable fashion in the same manner upon plate 101 which is apertured as at 170 to receive the pulley bearings 174. The wheels are retained upon such bearings by such means as the same form of retention plate 173 positioned against the lower face of each wheel; the bearings are further secured in the manner shown by means of the usual type of clips 175. The lower pulley wheels or idler wheels are of exactly the same configuration as the upper ones, each having but one flange, here shown as flanges 176 and 179. However, these lower idlers are reversed in position so that, with such flanges lowermost, the drag chain links on their return movement are supported at the pivot point, as shown in Figure 4. As in the first instance, the two flanges of the lower idlers are separated only that distance which is required for the passage of the vertical links of the drag chain, the horizontal links resting upon these flanges. Hence, the return flights are similarly supported in a positive manner about the central axis or pivot point represented by pivot pin 110 with the result that, despite even excessive angularities between adjacent units, the upper and lower flights in both instances are centered down the longitudinal axis of the trough and centered about the pivot point. This results in an operation wherein there is never any slack in the drag chain, thus eliminating the need for any take-up mechanism.

To further integrate relative motion between units in such manner as to prevent spillage of the conveyed materials, the bottom of the trough at its inby end is extended, as shown in Figure 4, where respective plates 4, 4a assume the configuration of two arcuate members 180 and 181. The arc of each is scribed upon the center of the pivoting motion and, being greater in circumference than the width of the base, the sides thereof extend outwardly somewhat as will be seen by reference to Figure 4.

Each of these arcuate members or extensions of the base plates 4, 4a, is angled towards the central axis or the pivot pin in such manner as to have the leading edges of each, in the embodiment herein described, at an angle to each other of approximately 60°. Such arcuate plates thus cover practically all of the idler wheel assemblies except that small portion at the inby end which is necessarily open for reception of the drag chain. The casings 150 and 151 may be welded to the underside of these base plates 4, 4a, respectively.

With respect to the conveyor beds or bottoms of the several units and again having reference to the arcuate extensions 180 and 181 formed on the inby end of each of the units, it is seen that these extensions, which are really continuations of the bed plates 4, 4a or bottom of unit B, overlie the bottom plates 4, 4a of unit A. These extensions, actually comprising a sliding surface for the adjoining trough unit, extend over and past the hinged or pivoted center of the sections at a somewhat greater radius than one-half of the width of the conveyor. The juxtaposition of these bed plates at their juncture point is shown in Figure 3, bed plates 4, 4a of unit A being dished as indicated at 230 to receive the overlying arcuate extension 180. The bottom of the trough of unit A continues rearwardly or toward the outby end of each unit to a point that is just short of the circular idler cages 150 and 151, which house the upper idler assemblies. The configuration of the bottom plates 4, 4a, unit A, is indicated in Figure 2 where the leading edges thereof, 231 and 232, appear curved towards the center line, the inner edges of the trough bottom being positioned just far enough apart to receive the vertical links of the drag chain and, of course, to permit interconnection of the chain through the half link 80 with the several flights.

Not only does the pivoting assembly, involving a twin idler construction, maintain a centering effect about the pivot point of the drag chain and flight units, but these units and the chain are also further supported in straight line fashion throughout the center line, from end to end of each unit. Reference is here being made particularly to chain and flight support during the conveying cycle of the mechanism or support of the assembly on top of the trough bottoms, as distinguished from carriage of the assembly during return movement. Accordingly, the longitudinally split sections of the bed 4 are secured together by a V-element or angular member 235, welded to each opposed edge of the innerside of the split bed, such edges being turned down as at 240 at angles complementary to the edges of element 235. The drag chain is thus supported throughout its length immediately underneath the plane of the trough bottom and to a point just short of its intercept with the idler roll assemblies. These, of course, by the V-shaped configurations 159 referred to above, provide their own support for the chain and, in addition, continue the function of support even during laterally deflected positions of individual units where such units are located at wide angularities.

As observed above, the trough bottom or pan is actually divided into two portions by the passageway 6. The latter progresses down the center line and, as heretofore explained, provides space for the flight interconnection 80 through its course of travel along the longitudinal center axis of the trough. Hence, the V-element 240 performs an additional function—that of interconnecting the two sections 4 and 4a comprising the base of each unit upon which the conveying flights ride. The foregoing is readily understandable by refernece to Figure 4 where the V-element 235 is shown as supporting the links of the drag chain and as likewise interconnecting the two pan portions 4 and 4a constituting the trough bottom.

It is necessary also that means be provided for closing the upper idler assemblies to the conveyed material, especially during periods when the several units are angularly disposed to each other. The means here provided includes a pair of sliding seals that constantly bear against each of the housings 150 and 151; in effect, such assembly amounts to a form of slip joint.

It has been stated that these housings are off center with respect to the pivot point; hence, it is readily understandable that as unit A is inclined to one side, the opposite housing would, relatively speaking, be retracted in that same amount and thus leave an open space permitting the discharge of conveyed material. Thus, the mechanism is one which is in constant sliding association with each of the housings despite change of position thereof due to lateral deflection of adjacent units.

In this respect, the referred to sliding, closure assembly includes two slide housings 190 and 191. Each of these has its forward edge curved or arcuately shaped, as at 191 and 192, to approximate a curve scribed about the pivot point. Each of these slides is made with upstanding or right-angular sides 197 and 198 and the edges of the latter welded to the respective bottom plate 4 or 4a of the adjacent unit or, as here disclosed, the outby end of unit A.

These slides are adapted to receive two sliding members or boxes 194 and 195 which are positioned parallel to the longitudinal axis of the individual unit and placed on each side of the center line thereof. Each of these slide engaging boxes is thus designed to bear against the curved surface of the housings 150 and 151, the forward curved surface 200 of each slide being concaved to approximate the shape of the idler housings.

A constant thrust is exerted against these sliding members 194 and 195 so that, and as aforementioned, despite any imposition of angularity between units, the sliding members remain in closed, sealing contact with the idler housings.

As here shown, each of the sliding members is subject to a given amount of thrust imposed by thrust elements mounted upon a suitable supporting member 202 which may simply consist of angle iron with its upper side welded to the base members 4 and 4a and its depending side appropriately apertured to receive the spring supporting bars 210 upon which are mounted helical springs 212. The latter are attached to one end of the sliding members by appropriate pins 215 and 216; and are further maintained in place upon the support 202 by the same type of pin 220. These thrust springs thus continuously force the two sliding members 194 and 195 against the curved interfitting edges of the casings 150 and 151. If the separate units are angled, the spring provides a take-up for the slides so that, despite the amount of offset from the longitudinal axis, the sliding members are maintained in the same relative sealing position, closing that space which would ordinarily be open to permit discharge of conveyed materials during angled positioning of the unit.

As another embodiment of the invention, the type of idler wheels hereinbefore described can be varied. With reference to Figures 6 and 7, it is seen that a type of pulley wheel is here utilized in the several idler assemblies. The remaining structure presented in these figures is substantially the same as that of the embodiment of the invention described above, such wheels being mounted upon the base plates 100 and 101, with the upper pair of idlers installed in the circular housings 150 and 151. These wheels are also rotatably positioned upon suitable shafts 250 secured in the appropriate bores 252 of the respective supporting plates. A similar type of means such as the referred to clips, here indicated at 255, maintains the shafts in position on one side and a face or bearing plate 268 provides support for the lower pair of idlers, as shown in Figure 6. The idlers of this modification are rimmed, as at 260, with a semi-circular groove 262 being cut between the rims. Such grooves may approximate in size the diameter of the stock of the drag chain but, as here shown, are substantially larger in diameter. The operation with respect to this modification is precisely the same as that explained with reference to the use of single rimmed idlers. The lateral links of the chain are supported upon the lower rims of each set of idlers, the latter being so spaced as to permit the vertical links of the drag chain to fit between the idlers. Here, again, the half link 80 projects upwardly between the longitudinal cut 6 in the bed plates of the trough where, of course, it is interconnected to the series of flights.

In this modification of the invention, it is apparent that the idlers are reversible, i. e., if wear becomes excessive, their positions can be reversed so that the upper rims become the lower supporting rims. In both instances it is apparent that in addition to simply mounting each of the idlers in rotatable fashion upon a stationary shaft, ball or roller bearings or other anti-friction means may be employed to facilitate the passage of the chain over the roller assemblies.

The invention described in the foregoing presents an extremely simplified but effective means for controlling a system of flights in such manner that they are always centered (with respect to both conveying and return drag chains), having reference to the longitudinal axis of any given trough unit. When such units are angularly inclined either laterally or vertically with respect to each other, as indicated in Figure 1, the length of chain remains unvaried. That is, the drag chain and flight assembly is of constant length whether or not the individual troughs are positioned in straight line fashion or are positioned angularly with respect to each other.

In normal operation excessive changes in elevation, or variations with respect to vertical inclinations, would not be encountered. At any rate, with the clearances involved and having reference particularly to the clearances of the pivot itself, such are of a magnitude to permit a deviation in vertical inclination of one unit with respect to the other of approximately 5°. In the commercial embodiment of the invention and having in mind a trough of approximately 30' in length, such clearances may be approximately one-eighth of an inch. This will permit vertical variations of the magnitude mentioned. The ability to angularly incline adjacent elements vertically with respect to each other is desirable in use of the equipment where the conveyor assembly is extended over a low swag in a mine or earth bottom. In this respect, since the natural tendency of the chain is to take the shortest path, the hold-down factor, found in the instant mechanism, effectively maintains the chain and flight assembly in close proximity to the trough bottom, no matter what the degree of vertical angularity may be.

In the presentation of a system and apparatus that effectively limits and maintains a flight assembly along the central line and on the pivot point, I have obviated the various disadvantages inherent in known and conventional systems from the viewpoint of adaptability to varied conditions, ease of operation at minimum power requirements, ease and low cost of construction and expansion of use of conveyor systems involving the trough type of unit.

Although the instant invention has been described with respect to the preferred embodiments thereof, it is to be understood that alterations and variations may be made without departing from the spirit or scope of the invention as defined by the appended claims.

I claim:

1. In a trough conveyor unit for conveying bulk materials and having endless conveying and return drag chain flights, means at each end of said unit for pivotal interconnection with an adjacent unit, means for maintaining said conveying and return flights along the longitudinal center line of said unit, rotatable idler means to receive and center said chain adjacent to said pivotal interconnection means, sealing means for said idler means comprising slidable male and female housings substantially surrounding said idler means, said female housings being provided with tension means to constantly exert thrust against said male housings.

2. In a trough conveyor unit of the endless type, a chain and flight assembly, means to maintain said assembly on the center line of said trough during actuation thereof, pivot means at one end of said trough for articulated interconnection with another of said units, means to maintain said chain in line with said pivot means during actuation thereof, said last named means comprising rimmed idlers rotatably mounted on each side of said pivot means and so spaced as to support the links of said chain on the rims thereof, and sealing means for said idlers comprising male and female arcuate housings adjacent thereto and adapted to substantially surround said idlers despite angular deflection with respect to another of said units.

3. In a trough conveyor unit of the endless type, a conveying chain and flight assembly and a return chain and flight assembly, means to maintain both of said assemblies on the center line of said trough during actuation thereof, pivot means at one end of said trough for articulated interconnection with another of said units, means to maintain both the conveying and return assemblies in line with said pivot means during actuation thereof, said last named means comprising two pairs of rimmed idlers rotatably mounted on each side of said pivot means and so spaced as to support the links of said chain on the rims thereof, and sealing means for said idlers comprising male and female arcuate housings adjacent thereto and adapted to substantially surround said idlers despite angular deflection with respect to another of said units.

4. In a trough conveyor unit for conveying bulk materials, a chain and flight assembly of the endless type, means to maintain said assembly on the center line of said trough during actuation thereof, pivot means at one end of said trough for angular, articulated interconnection with another of said units, means to maintain said assembly in line with said pivot means during actuation thereof, said last named means comprising a pair of rimmed idlers rotatably mounted on each side of said pivot means and so spaced as to support the links of said chain on the rims thereof, and means to seal said pivot means against material discharge comprising circular housings therefor, plate means having configurations to match said housings and means to thrust said plate means against said housings at any angle of articulation of said unit with respect to another unit.

5. In a trough conveyor unit of the endless type, drive and return chain and flight assemblies, means to maintain said assemblies on the center line of said trough during actuation thereof, pivot means at one end of said trough for articulated interconnection with another of said units, and means to maintain said assemblies in line with said pivot means during actuation thereof, said last named means comprising two pair of rimmed idlers rotatably mounted on each side of said pivot means, and so spaced as to support the lengths of said chain on the rims thereof, one pair of said idlers supporting said drive chain therebetween, the other pair supporting said return chain therebetween, and arcuate, upright housings surrounding the space around said pivot means and said drive chain idlers to seal said space against material discharge despite articulation of said unit with respect to an adjacent unit.

6. In a trough conveyor unit of the endless type for conveying bulk materials, a drive and return chain and flight assembly, means to maintain said assembly along the center line of said trough during actuation thereof including a central V-shaped element to support said drive chain, pivot means at one end of said trough for articulate interconnection with another of said units, and means to maintain said assembly in line with said pivot means during actuation thereof, said last named means comprising two pairs of rimmed idlers rotatably mounted on each side of said pivot means and so spaced as to support the links of the chain on the rims thereof, one pair of idlers being superimposed above the other pair and in axial alignment therewith, circular housings surrounding the upper of said pair of idlers, sealing means to seal the spaces around the upper of said housings, said sealing means comprising a pair of sliding supports, slide means matching the configuration of said housings and adapted to reciprocate in said supports, and tension means exerting thrust against said flights whereby the space around said pivot means is closed to the discharge of conveyed materials during articulation of said unit with an adjacent unit.

7. In an articulated conveyor system for conveying materials, a series of trough units adapted to receive a driven chain and flight assembly and a return chain and flight assembly down the center line thereof, pivot means to pivotally interconnect the adjacent of said units to permit angular deflection therebetween, and means upon one end of each of said units to drive said assemblies through said pivot means, and to maintain said assemblies on said center line when said units are angularly deflected, said means comprising pairs of idler wheels on each side of said pivot means, said wheels being flanged on at least one side thereof, means to direct said driven chain over the flanges of one pair of wheels and means to direct the return chain through the other pair of idler wheels, arcuate male and female housings surrounding said one pair to seal the same, said female housings being spring biased against said male housings, whereby said assemblies are maintained in the same vertical plane as said pivot means when said units are angularly deflected with respect to each other, and said one pair of idlers are sealed against said materials despite said angular deflection.

8. In an articulated system for conveying materials, a series of trough units adapted to receive a driven chain and flight assembly and a return chain and flight assembly down the center line thereof, pivot means to pivotally interconnect the adjacent of said units to permit angular deflection therebetween, and means upon one end of each of said units to drive said assemblies through said pivot means, and to maintain said assemblies on said center line when said units are angularly deflected with respect to each other, said means comprising upper and lower pairs of idler wheels on each side of said pivot means, the upper of said pairs having sealing means therefor, said sealing means comprising arcuate male and female housings surrounding said upper pairs, said wheels being flanged on at least one side thereof, means to direct said driven chain over the flanges of one pair of wheels and means to direct the return chain through the other pair of idler wheels, whereby said assemblies are maintained in the same vertical plane as said pivot means in said units are angularly deflected with respect to each other, and said upper idlers are sealed against said materials when said units are deflected with respect to each other.

9. In an articulated conveyor system, a series of trough conveyor units adapted to receive a driven chain and flight assembly and a return chain and flight assembly down the center line thereof, means to maintain and support said chain along the centerline of each of said units, pivot means to pivotally interconnect the adjacent of said units to permit angular deflection therebetween, and means upon the inby end of each of said units to guide said assemblies through said pivot means, said last named means comprising two pairs of rimmed idlers rotatably mounted on each side of said pivot means and so spaced as to support the links of the chain on the rims thereof, one pair of idlers being superimposed above the other pair and in axial alignment therewith, circular housings surrounding the upper of said pair of idlers, sealing means to seal the spaces around the upper of said housings, said sealing means comprising a pair of sliding supports, slide means matching the configuration of said housings and adapted to reciprocate in said supports, and tension means exerting thrust against said flights whereby the space around said pivot means is closed to the discharge of conveyed materials during articulation of said unit with an adjacent unit.

References Cited in the file of this patent

UNITED STATES PATENTS

| | | |
|---|---|---|
| 306,961 | Rundell | Oct. 21, 1884 |
| 2,366,407 | Jeffrey | Jan. 2, 1945 |
| 2,381,108 | Cartlidge | Aug. 7, 1945 |
| 2,543,368 | Jones et al. | Feb. 27, 1951 |
| 2,699,250 | Keen et al. | Jan. 11, 1955 |

FOREIGN PATENTS

| | | |
|---|---|---|
| 507,904 | Germany | Sept. 22, 1930 |